No. 884,316. PATENTED APR. 7, 1908.
C. A. CONRARD.
FASTENER.
APPLICATION FILED JUNE 3, 1907.
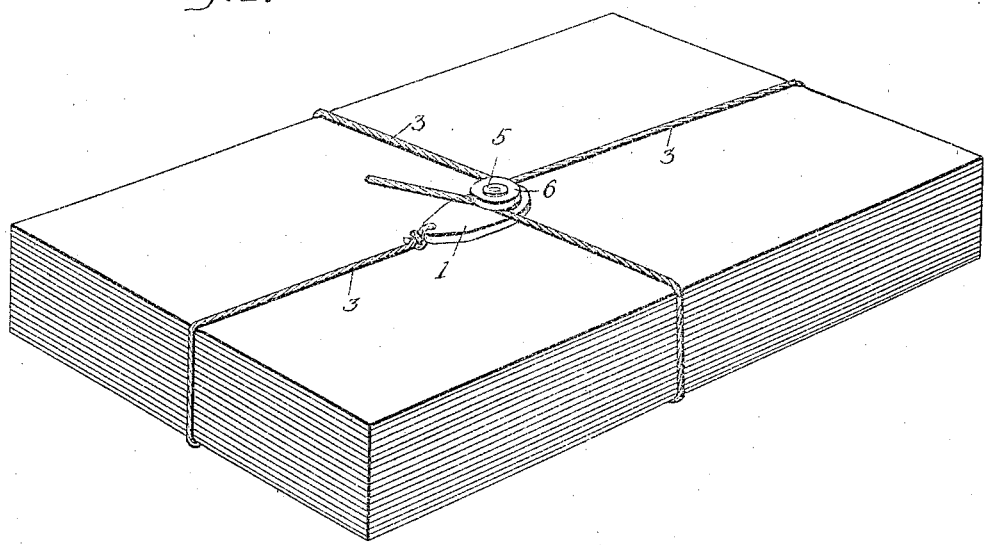
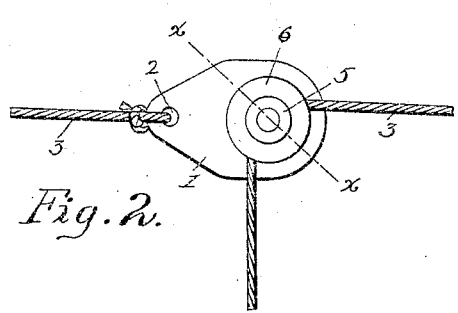
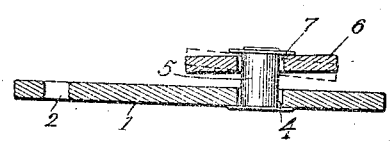
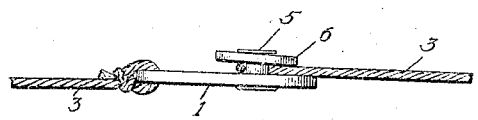
Witnesses
C. N. Walker
Grace P. Brereton
Inventor
Charles A. Conrard
By Sturtevant & Mason
Attorneys

UNITED STATES PATENT OFFICE.

CHARLES A. CONRARD, OF WASHINGTON, DISTRICT OF COLUMBIA.

FASTENER.

No. 884,316.         Specification of Letters Patent.         Patented April 7, 1908.

Application filed June 3, 1907. Serial No. 376,957.

*To all whom it may concern:*

Be it known that I, CHARLES A. CONRARD, a citizen of the United States, residing at Washington, in the District of Columbia, have invented certain new and useful Improvements in Fasteners, of which the following is a description, reference being had to the accompanying drawing, and to the letters and figures of reference marked thereon.

My invention relates to fasteners wherein it is desired to secure a cord or the like temporarily; and while said fastener may be used for fastening garments or in connection with garment supporters, said fastener is especially adapted for securing packages such as packages of mail matter.

The object of my invention is to provide a reliable means for fastening the end of a cord or the like, without tying a knot and which may be released without injury to the cord whereby the same may be used over again and again.

My invention consists in the parts and arrangements hereinafter shown, described and set forth in the claims.

In the drawings which show by way of illustration, one embodiment of my invention; Figure 1 is a perspective view showing a package having my fastener applied thereto. Fig. 2, is a top plan view of the fastener showing the cord as it first passes through the fastener. Fig. 3, is a side view of the same. Fig. 4 is a view similar to Fig. 3, with the cord passed around the fastener and in gripping position. Fig. 5, is a sectional view through the fastener, showing in dotted lines, the upper plate in tilted position.

My improved fastener comprises a lower plate 1, which may be of any desired shape and which is provided with an opening 2, in which is secured a cord 3. It is obvious that said cord may be secured in any other manner to the plate 1. The plate 1 is also provided with an opening 4, through which extends a head rivet 5. The shank of said rivet 5, as shown in the drawings, is slightly smaller than the opening 4, so that while said rivet is held from disengagement with the plate 1, it may be tilted to one side of a line perpendicular to the plate 1. An upper plate 6 having an opening 7, is mounted upon the rivet 5, and secured thereto by the usual washer or head of said rivet. The opening 7, in the plate 6, is made slightly larger than the body of the rivet 5, so that said plate may be tilted relative to the longitudinal axis of the rivet or relative to the lower plate 1. The distance between the two heads of the rivet, is such that the upper and lower plates may be spaced from each other. The parts are preferably so proportioned that when the upper plate 6 is tilted as shown in dotted lines in Fig. 5, the cord 3, may be readily inserted between the upper and lower plates on the left hand side of the rivet as shown in Fig. 5. When however, the upper plate is moved back to horizontal position by the continued wrapping of the cord about the rivet as shown in Figs. 1 and 4, the cord will be firmly gripped on both sides of said rivet.

In the operation of my device, when wrapping a package such as shown in Fig. 1, the plate 1 is laid upon the package and the upper plate 6 tilted along the line $x$—$x$ of Fig. 2, and the cord which has been passed around the package, is carried around the rivet on the left as shown in Figs. 2 and 3. The upper and lower plates at this time, owing to the tilting of the same relative to each other, allow the cord to pass freely, and therefore, the cord may be drawn tightly around the package. The cord is then passed transversely around the package and wrapped around the rivet on the opposite side as shown in Figs. 1 and 4. The cord as it now passes between the plates 1 and 6, draws between the upper plate and the cord which is previously passed around the pivot, and is securely gripped between said plates. The cord may be passed again around the rivet between the upper and lower plates if desired, giving a still firmer lock to the cord. When it is desired to release the cord, the end is grasped and turned in the opposite direction around the pivot.

While I have shown both the upper and lower plates as having an opening larger than the pivot, it is obvious that if either one of these plates is provided with a large opening, the same result would be secured.

While I have shown the upper and lower plates of my device as flat, it will be obvious that either or both of said plates may be dish-shaped with the concave or convex portions facing each other, or that said plates may be of any shape whatever.

Having thus particularly described my invention, what I claim as new and desire to secure by Letters Patent is:—

1. A fastener including in combination, a lower plate having an opening therein, a cord or the like secured to said plate, an upper plate having an opening therein, and a rivet in said opening and passing through said plates for securing the same together securing means carried by the rivet and engaging the outer faces of said plates, said rivet being of less diameter than the opening in one of said plates, whereby the plates may be tilted relative to each other.

2. A fastener including in combination a lower plate having an opening therein, a cord or the like secured to said plate, an upper plate having an opening therein, a rivet passing through said openings for securing said plates together, said rivet being of less diameter than the openings in said plates, whereby one of said plates may be tilted relative to the other.

In testimony whereof I affix my signature, in presence of two witnesses.

CHARLES A. CONRARD.

Witnesses:
EUGENE G. MASON,
C. L. STURTEVANT.